March 10, 1964     A. L. PRENTICE     3,124,221
BRAKE SHOE RETAINER KEY
Filed Feb. 21, 1962
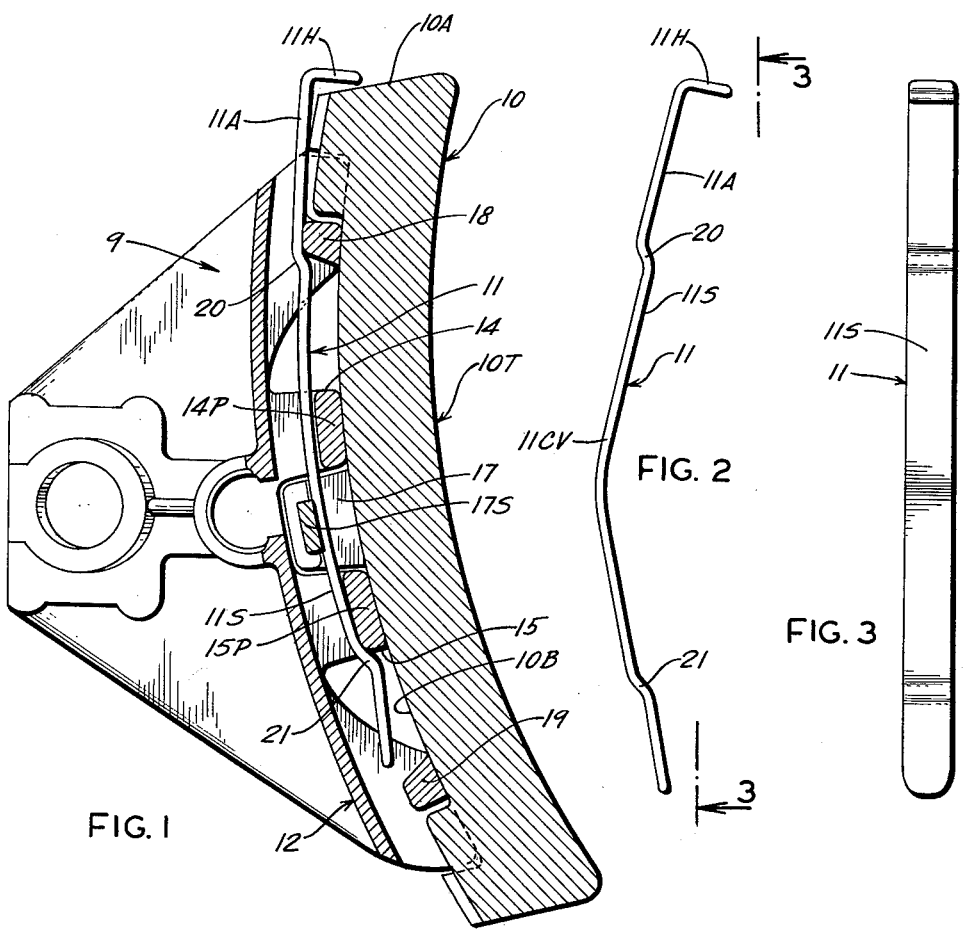
INVENTOR.
ALLAN L. PRENTICE
BY
*Wallace Kinzer and Dorn*
ATTORNEYS 3,124,221
BRAKE SHOE RETAINER KEY
Allan L. Prentice, Ashtabula, Ohio, assignor to American Brake Shoe Company, New York, N.Y., a corporation of Delaware
Filed Feb. 21, 1962, Ser. No. 174,762
1 Claim. (Cl. 188—243)

This invention relates to brake structure for railroad cars and in particular is concerned with that portion of the railroad brake structure that is inclusive of the brake head, the associated shoe and the retainer which serves to hold these two members together.

A railroad brake shoe member is commonly connected to the so-called brake head member by a removable key of the elongated leaf type which is under spring tension between opposed parts of the aforesaid member. Specifically, U-shaped lugs projecting from the respective members are interrelated when the members are juxtaposed to afford a keyway into which is inserted a retainer key. The key in its free state is arched, but the keyway is of such shape as to flex the key to create the desired spring force when the key is driven home.

Even though the key is under a great deal of tension in its installed state, it is advantageous to afford means other than friction for preventing accidental displacement thereof. Under and in accordance with the present invention, and such is the primary object of the present invention, the key is locked in place by two off-sets in the shank thereof which engage edge portions of projecting elements of the brake head member, and the head of the key is so bent as to be immediately adjacent the end of the shoe to enable effective forces to be established, using the end of the shoe as a fulcrum, for withdrawing the key.

Other and further objects of the present invention will be apparent from the following description and claim and are illustrated in the accompanying drawings which, by way of illustration, show a preferred embodiment of the present invention and the principle thereof and what is now considered to be the best mode contemplated for applying that principle. Other embodiments of the invention embodying the same or equivalent principles may be used and structural changes may be made as desired by those skilled in the art without departing from the present invention.

In the drawings:

FIG. 1 is a sectional view of associated brake head and brake shoe members secured together by a key constructed under and in accordance with the present invention;

FIG. 2 is a side elevation of the key in its free state; and

FIG. 3 is a plan view taken along the line 3—3 of FIG. 2.

The brake structure illustrated in FIG. 1 is inclusive of a brake head member 9, an associated brake shoe member 10 and a retainer key 11, the latter being inserted in a keyway hereinafter defined to hold the two members together.

The brake shoe member 10 is arcuate in form and includes an arcuate tread portion 10T and an arcuate back portion 10B. The curve for the tread of the shoe corresponds to the curve of the tread on the car wheel to be engaged by the brake shoe 10 when the associated brake operating mechanism (not shown) is actuated.

The brake head member is provided with an arcuate plate 12 and a pair of U-shaped lugs 14 and 15 that project toward the back of the shoe. The lugs 14 and 15 have pad or strap portions 14P and 15P, respectively, the outer faces of which engage the arcuate back 10B of the shoe 10.

A center attaching lug 17 projects from the back of the shoe 10 in position to lie between the lugs 14 and 15 when the members aforesaid are properly related. The center attaching lug 17 is provided with a strap or bight portion 17S so that the lug 17 is in the form of a U-shaped lug, the opening of which cooperates with the openings afforded by the U-shaped lugs 14 and 15 to define a keyway into which the key 11 can be inserted when the members are juxtaposed as they are in FIG. 1.

It will also be noted in FIG. 1 that the brake head member is provided adjacent the upper and lower ends thereof with so-called tie bars 18 and 19 having surfaces engageable with the back of the shoe 10.

Under and in accordance with the present invention, the shank 11S of the key is provided with spaced off-sets 20 and 21 which, when the key is fully inserted, respectively engage the edges of the upper one of the end tie bars 18, and one of the lug pads, as 15P. Further, the portion of the key shank 11S between the off-sets 20 and 21 is bent so that the key is convex in the direction of the strap of the center attaching lug 17, such convexity being indicated by the reference character 11CV.

The key is of such shortened length that it does not project beyond the lower end tie bar 19 and hence is quite concealed.

It will be recognized by a comparison of FIGS. 1 and 2 that when the key is driven home the bend 11CV is flexed to remove the concavity, and resultantly, the key is uniformly curved along its length between the off-sets. This characterizes an exceptionally strong spring tension at the side of the strap 17S that faces the back of the brake shoe 10. At the same time, the key bears with strong spring force against the side of the pad 15P and the side of the end tie bar 18 that face toward the plate 12 of the brake head member 9. Moreover, and when the key is properly inserted, the off-set 20 hangs over the inside edge of the one tie bar 18 so as to abut thereagainst, and the other off-set 21 hangs over the edge (of the same hand as said edge of the tie bar 18) of the one pad 15P so as to abut thereagainst. In other words, in the fully inserted position of the key, the offsets 20 and 21 engage edges of the parts 18 and 15P that are of the same hand when the structure shown in FIG. 1 is oriented in a horizontal plane rather than a vertical plane.

These abutting relationships, coupled with the strong spring forces entailed, prevent any accidental displacement of the key 11. In fact, the holding forces entailed are quite strong, and in order to facilitate removal of the key when this is intended, the head 11H of the key is bent sufficiently at right angles to the adjacent portion 11A of the shank key so as to hang over the adjacent or upper end 10A of the shoe 10 as viewed in FIG. 1. Viewed another way, the head 11H is bent in the direction of the concave portion of the bend in the shank that lies between the off-sets 20 and 21. This relationship enables a prying tool to be inserted between the adjacent surfaces of the end 10A of the shoe and the head 11H of the key so as to apply what corresponds in FIG. 1 to a strong upward withdrawing force on the key 11.

Thus, under the present invention, the end of the shoe is used as a fulcrum for establishing the necessary force to withdraw the key 11 from its inserted position.

I claim:

Railroad brake structure including a brake head member, a brake shoe member and a retainer key; the brake head member including spaced end tie bars and spaced intermediate arch-like lugs having outer surfaces engaged by the back of the shoe member; said shoe member having an arch-like center attaching lug projecting from the back thereof and disposed between the first-named lugs to define therewith a key-way in which the key is disposed; said key in its fully inserted position including: an elongated shank and an angled head at one end of the shank, said head of the key being bent away from said head member to overhang for a substantial extent one end of the shoe member and in close proximity thereto so that a prying tool can be effectively levered therebetween for removing the key; said key having first and second off-sets in the shank thereof spaced to respectively engage an edge of given hand of one of the lugs on the head member and an edge of the same hand of one of the tie bars to prevent accidental displacement of the key from the key-way, and the shank of said key being arched between said off-sets to such an extent that one portion thereof bears against said one lug, another portion thereof bears against said one tie bar and an intermediate portion thereof bears against the underside of said center attaching lug under spring tension to hold the shoe to the head member tightly with a spring force.

References Cited in the file of this patent

UNITED STATES PATENTS

| | | |
|---|---|---|
| 1,451,332 | Emery | Apr. 10, 1923 |
| 1,729,010 | Paterson | Sept. 24, 1929 |
| 2,028,753 | Busch | Jan. 28, 1936 |
| 2,138,196 | Prentice | Nov. 29, 1938 |
| 2,873,825 | Prentice | Feb. 17, 1959 |